US006171623B1

(12) United States Patent
Gaylor et al.

(10) Patent No.: US 6,171,623 B1
(45) **Date of Patent: *Jan. 9, 2001**

(54) LIQUID FEED BOTTLE

(75) Inventors: Ian Michael Daines Gaylor, Ely; Christopher John Andrew Barnardo, London; Patrick Sweeting, Bromsgrove, all of (GB)

(73) Assignee: Cambridge Consultants Limited, Cambridge (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/913,549

(22) PCT Filed: Mar. 1, 1996

(86) PCT No.: PCT/GB96/00465

§ 371 Date: Nov. 17, 1997

§ 102(e) Date: Nov. 17, 1997

(87) PCT Pub. No.: WO96/27361

PCT Pub. Date: Sep. 12, 1996

(30) Foreign Application Priority Data

Mar. 3, 1995 (GB) ............................................. 9504602
Nov. 24, 1995 (GB) ............................................. 9524046

(51) Int. Cl.[7] ......................... A21D 10/02; B65B 55/00; A61J 9/08; A61J 11/02

(52) U.S. Cl. ......................... 426/117; 426/123; 426/399; 426/394; 426/397; 215/11.1; 215/11.5; 215/11.6

(58) Field of Search .................................. 426/117, 123, 426/399, 397, 394, 413; 215/11.1, 11.5, 11.6

(56) References Cited

U.S. PATENT DOCUMENTS

| | | | |
|---|---|---|---|
| 2,571,010 | 10/1951 | Busch | 215/11 |
| 3,193,125 | 7/1965 | Fischer | 215/11 |
| 4,886,175 * | 12/1989 | Schlaudecker . | |

FOREIGN PATENT DOCUMENTS

| | | |
|---|---|---|
| 660 992 | 7/1965 | (BE) . |
| 2 219 909 | 3/1973 | (DE) . |
| 0 425 264 | 5/1991 | (EP) . |
| 0 612 511 | 8/1994 | (EP) . |
| 1 509 197 | 1/1968 | (FR) . |
| 2 324 287 | 4/1977 | (FR) . |
| 2 333 491 | 7/1977 | (FR) . |
| 2 164 860 | 4/1986 | (GB) . |

* cited by examiner

*Primary Examiner*—Anthony J. Weier
(74) *Attorney, Agent, or Firm*—Lee, Mann, Smith, McWilliams, Sweeney & Ohlson

(57) ABSTRACT

A liquid feed bottle for an infant having a body made from a container portion bonded to a teat with an orifice. The body holds a liquid feed such as milk. A cap is bonded or sealed to the body and protects the teat. A cap portion is initially detachable from the body by pulling and removing a tear strip, the cap portion thus released being subsequently securable on the body by a press fit.

17 Claims, 15 Drawing Sheets

LIQUID FEED BOTTLE

This application has been filed under 35 USC 371 as a national stage application of PCT/GB96/00465 filed on Mar. 1, 1996.

This invention relates to liquid feed bottles for use by infants and possibly also for use by young animals. The invention also relates to methods of making such bottles.

Figure 1:
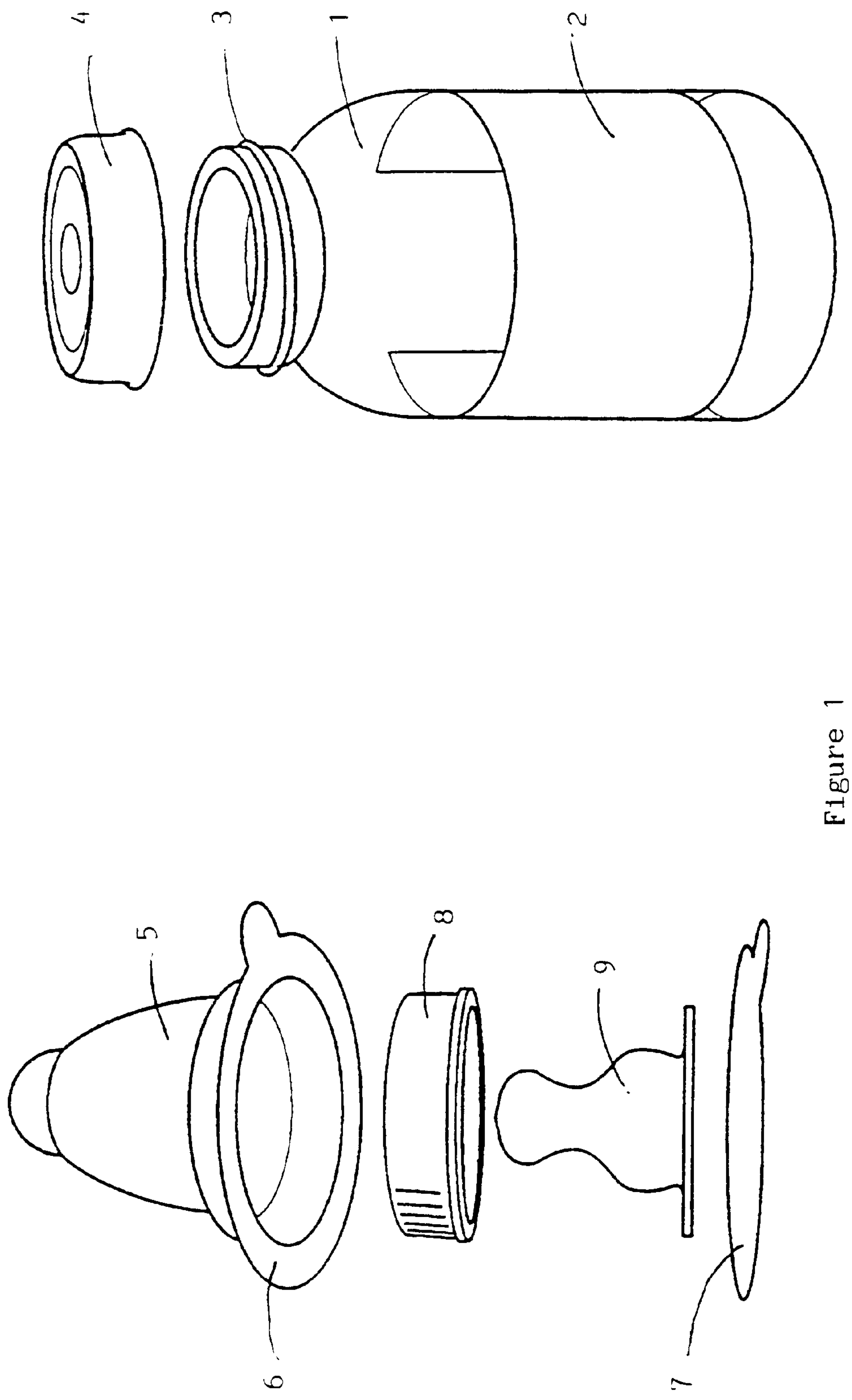

FIG. 1 of the accompanying drawing shows, in exploded view, a conventional liquid feed bottle of the kind commonly used to feed milk to infants in hospitals. The bottle comprises two sub-assemblies: the first comprises a glass container 1 bearing a label 2 for identifying matter and having a screw neck 3 closed by a metal lid 4. The closed container contains liquid milk feed in a sterile condition; the second sub-assembly comprises a hollow vacuum-formed cap 5 having a projecting ledge 6 to which is sealed a sealing foil 7. A plastics ring 8 and a rubber teat 9 are accommodated in the sterile space enclosed by the cap 5 and the foil 7. These two sub-assemblies are supplied to the user, such as a nurse in a hospital, who removes the foil 7 from the ledge 6 to expose the ring 8 and teat 9. The two latter components are attached to the container 1 in place of the metal lid 4, to provide a liquid feed bottle ready for use. Such a known bottle thus comprises six components (apart from the milk), and the invention aims to provide a liquid feed bottle which has fewer components and is simpler and cheaper to manufacture.

According to one aspect of the invention there is provided a liquid feed bottle holding a liquid feed for internal consumption by a young mammal, the bottle comprising a body which holds the liquid feed and which has a container portion and a teat or spout with an outlet orifice, and a cap which covers and protects the teat or spout, wherein the cap is bonded or sealed to the body, at least a portion of the cap being initially detachable from the body by rupturing a tear strip and being subsequently securable on the body by a press fit.

According to another aspect of the invention there is provided a method of making a bottle containing a liquid feed, comprising attaching a teat or spout and a cap to a container portion pre-filled with the liquid feed to yield a filled and sealed bottle with the teat or spout covered and protected by the cap at least a portion of which, on rupturing a tear strip, is detachable from the teat or spout to expose an outlet orifice in the teat or spout.

According to a yet further aspect of the invention there is provided a method of making a bottle containing a liquid feed, comprising attaching together a teat or spout and a cap to form a sub-assembly, and attaching the sub-assembly to a container portion pre-filled with the liquid feed to yield a filled and sealed bottle with the teat or spout covered and protected by the cap at least a portion of which, on rupturing a tear strip, is detachable from the teat or spout to expose an outlet orifice in the teat or spout.

The invention also relates to a method of making a bottle containing a liquid feed, comprising blow moulding a pre-form to form a bottle blank having a body with a teat or spout, filling the blank with the liquid feed whilst the bottle is oriented with its teat or spout lowermost, sealing a filling hole to form an enclosed bottle containing the liquid feed, inverting the filled bottle so that the teat or spout is uppermost, forming an outlet orifice in the teat or spout to enable the liquid feed to be extracted from the bottle, and attaching to the body a cap which covers and protects the teat or spout and at least a portion of which, on rupturing a tear strip, is detachable from the body.

Figure 3:
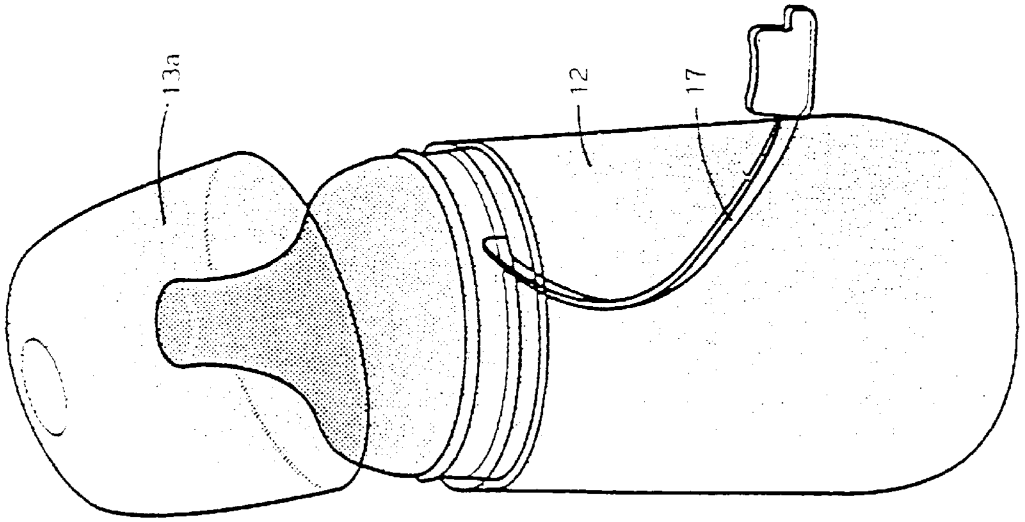
Figure 2:
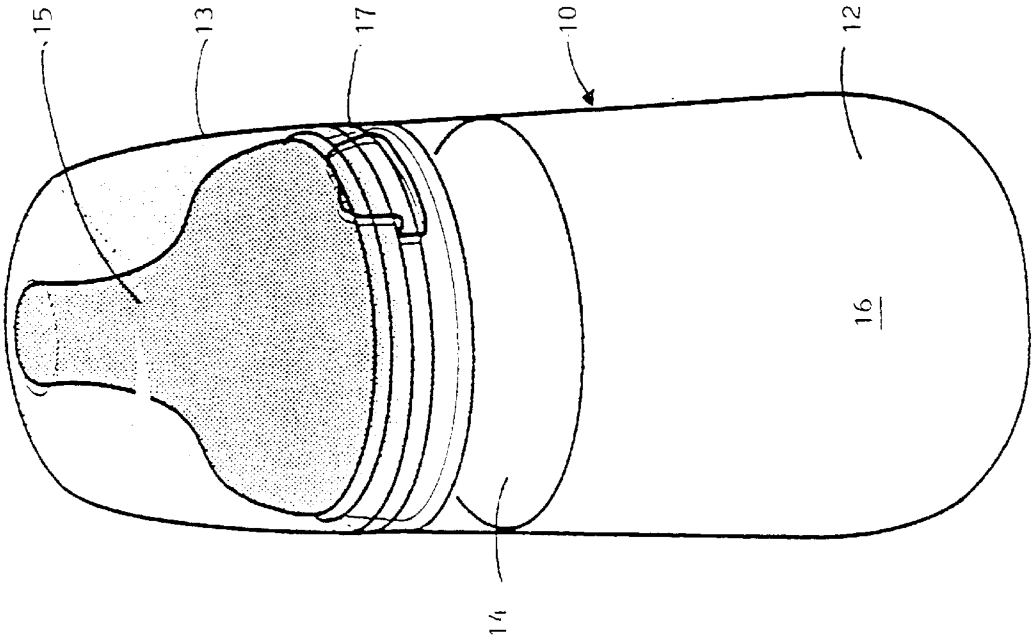
Figure 5:
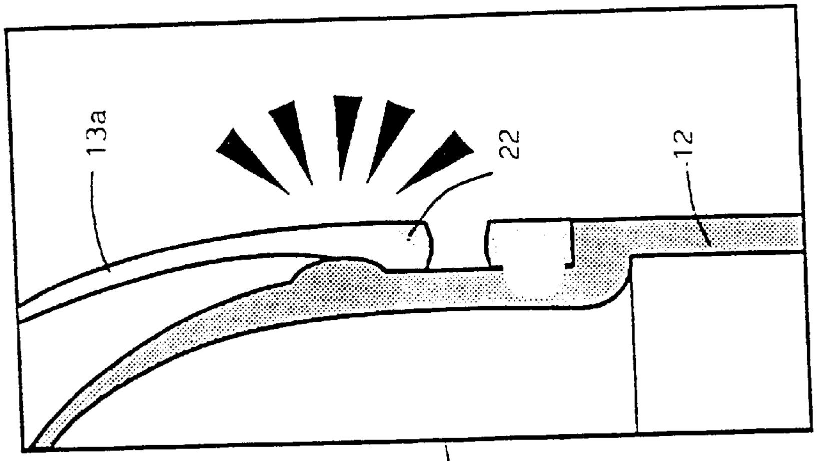
Figure 4:
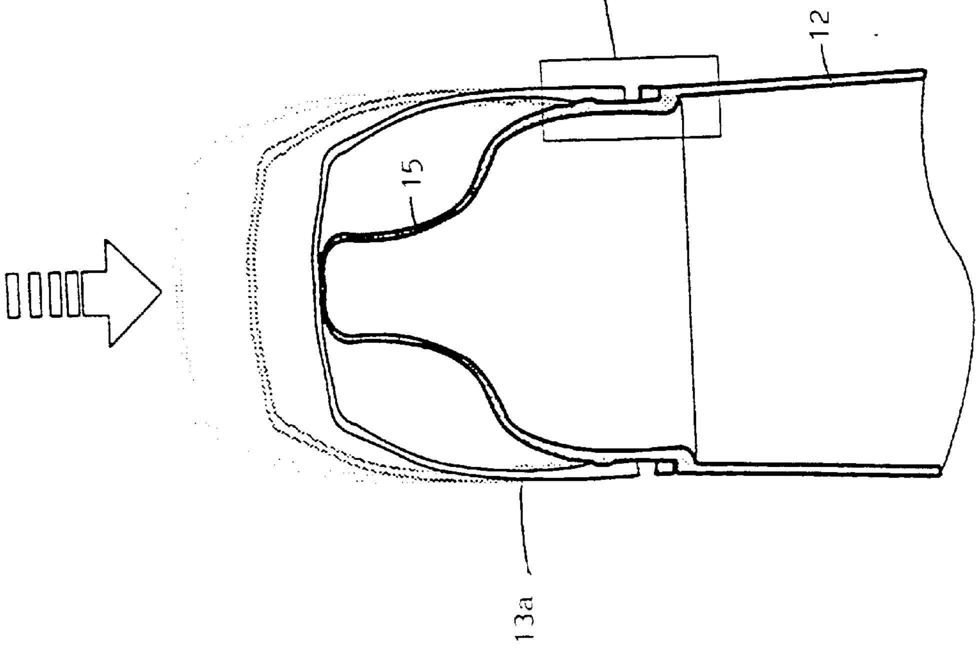
Figure 8:
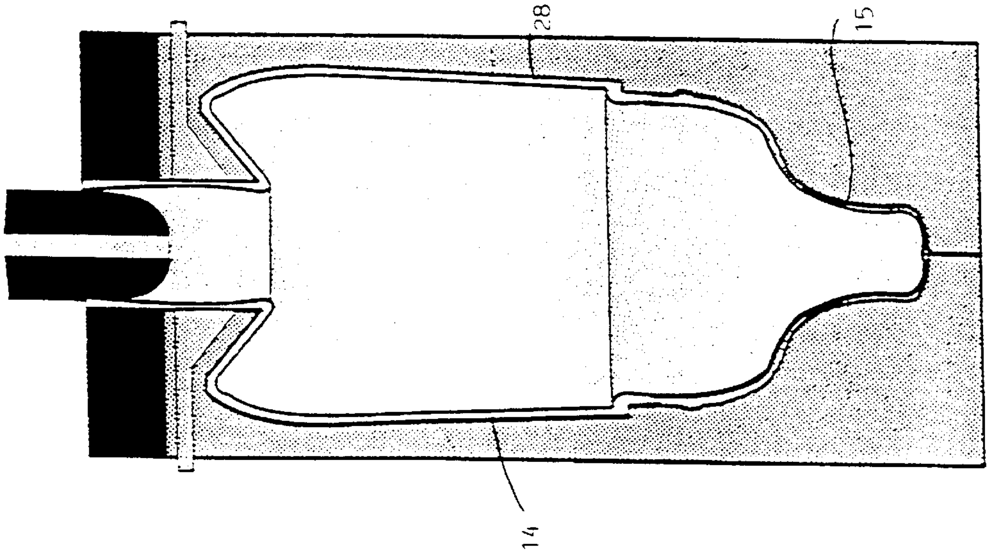
Figure 7:
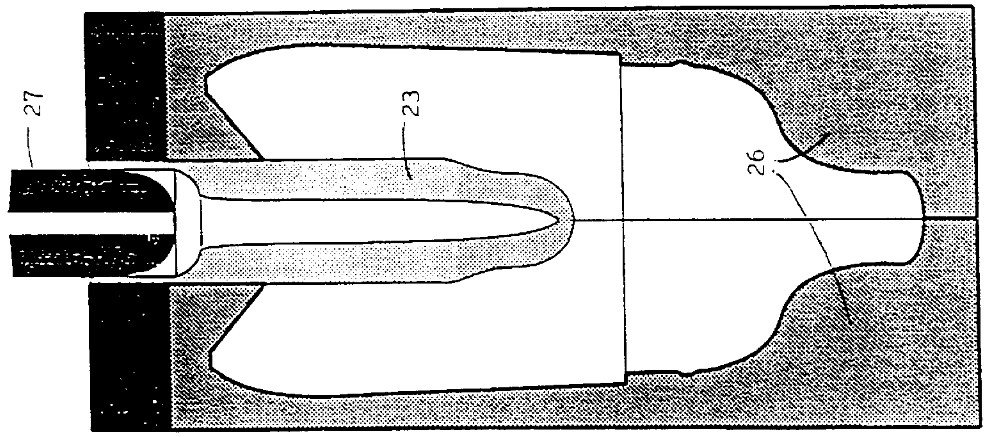
Figure 6:
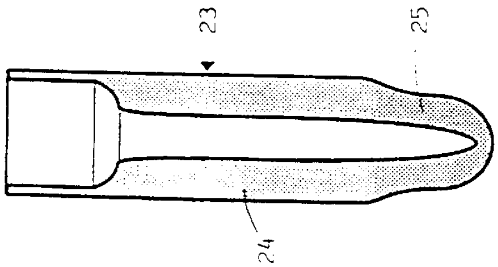
Figure 11:
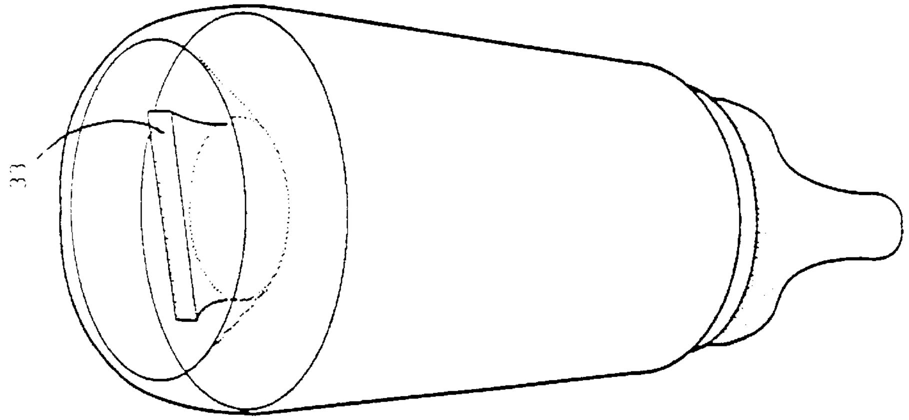
Figure 9:
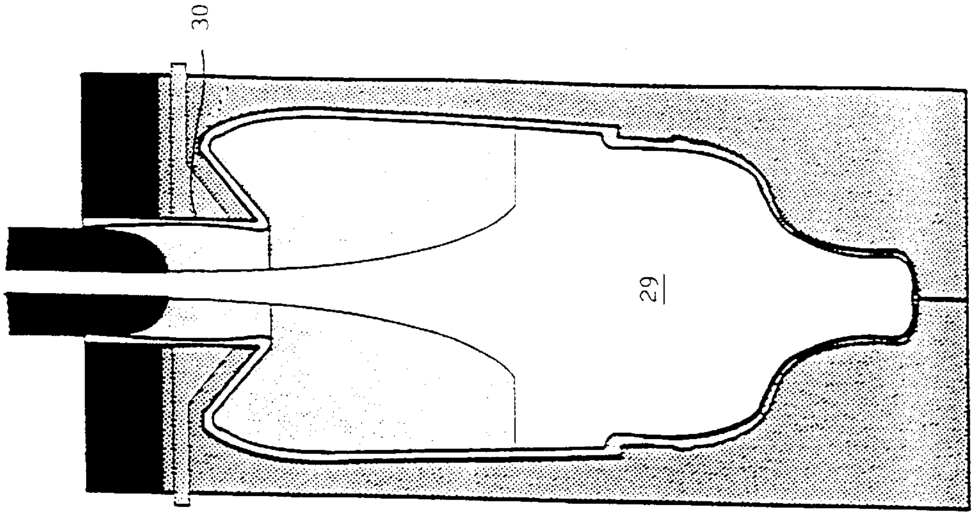
Figure 10:
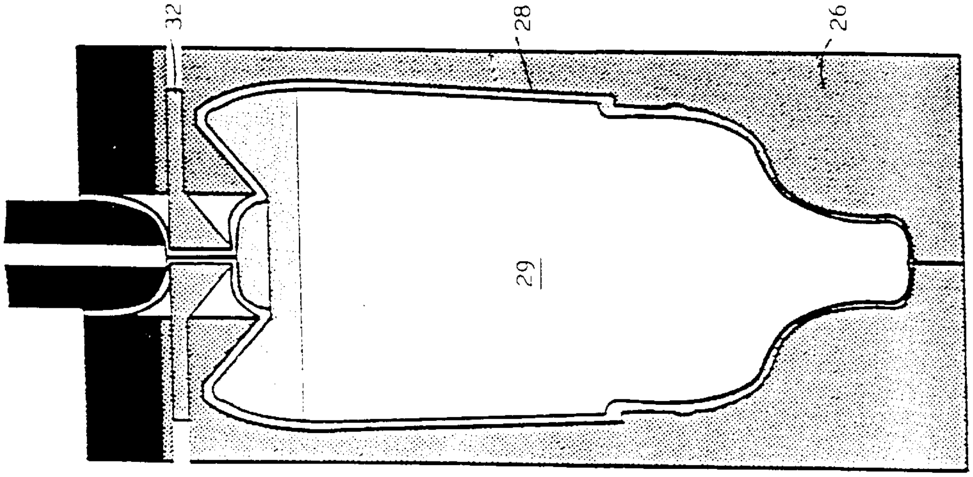
Figure 14:
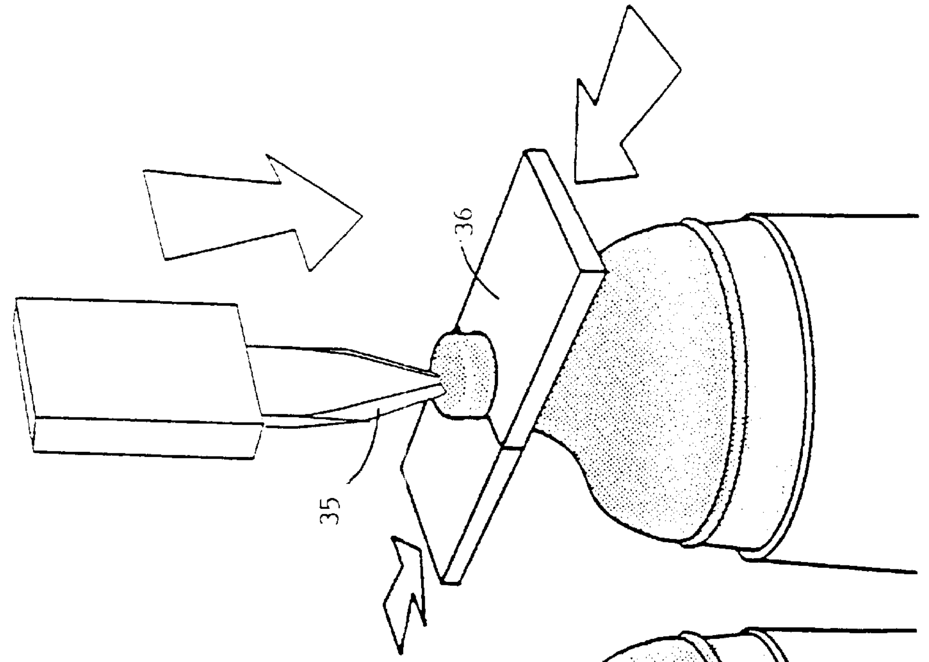
Figure 13:
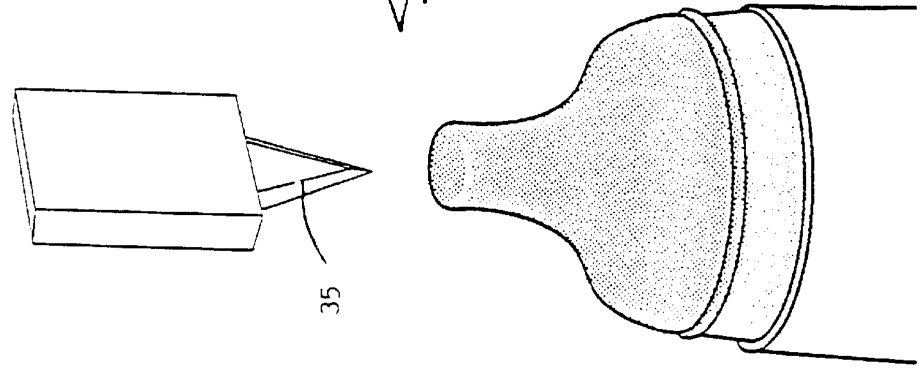
Figure 12:
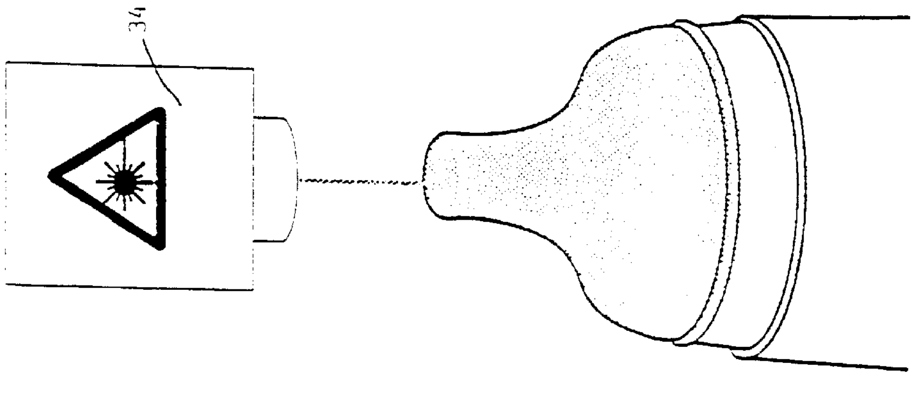
Figure 16:
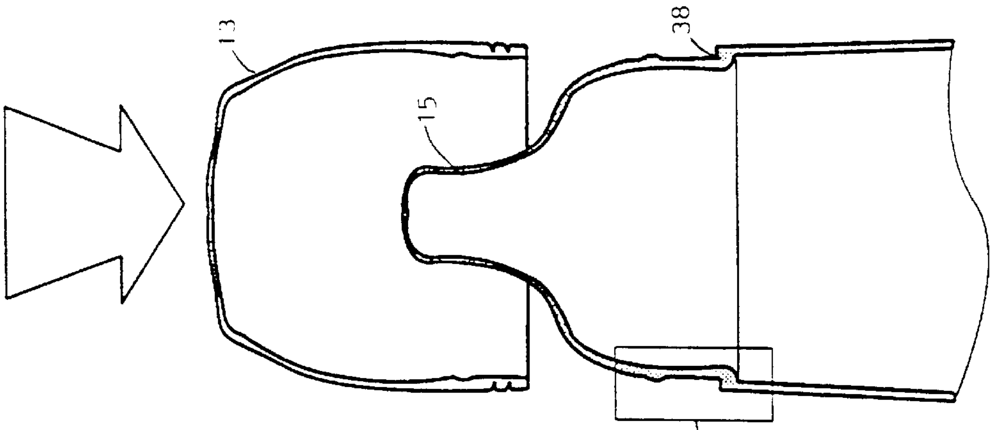
Figure 17:
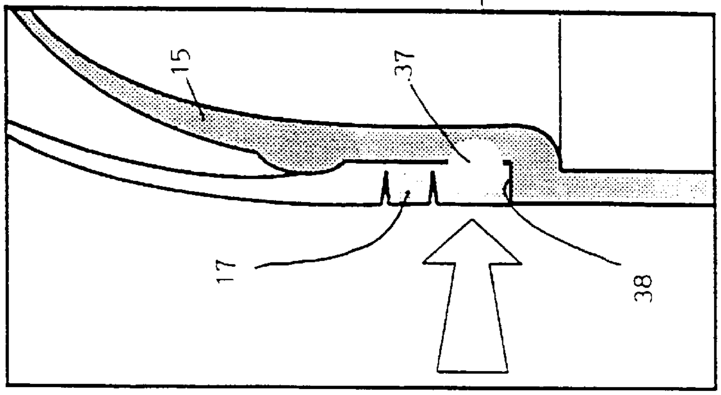
Figure 15:
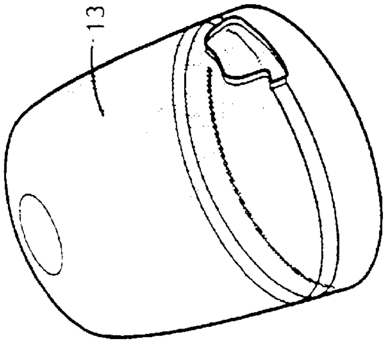
Figure 19:
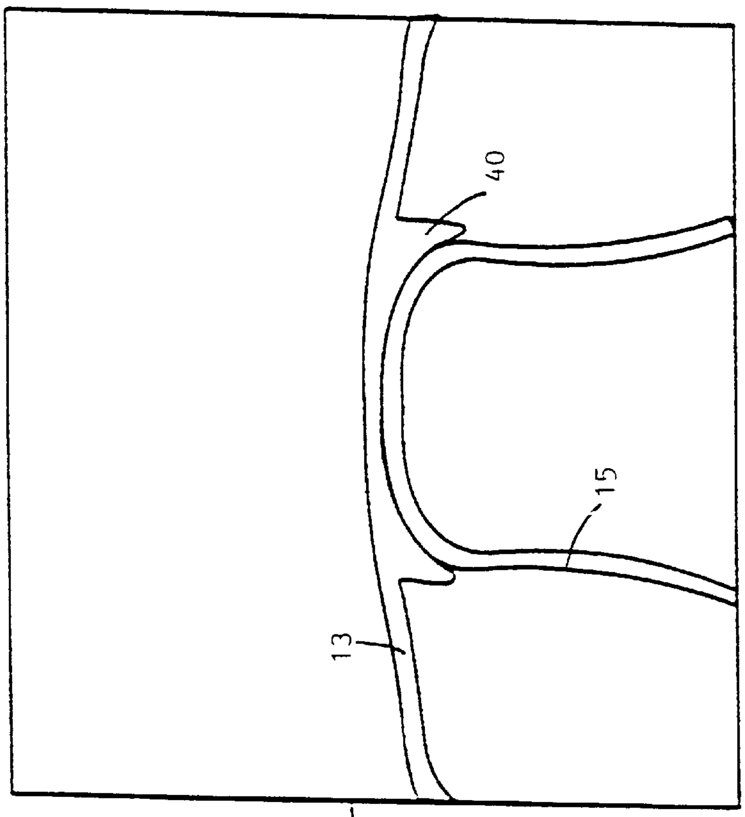
Figure 18:
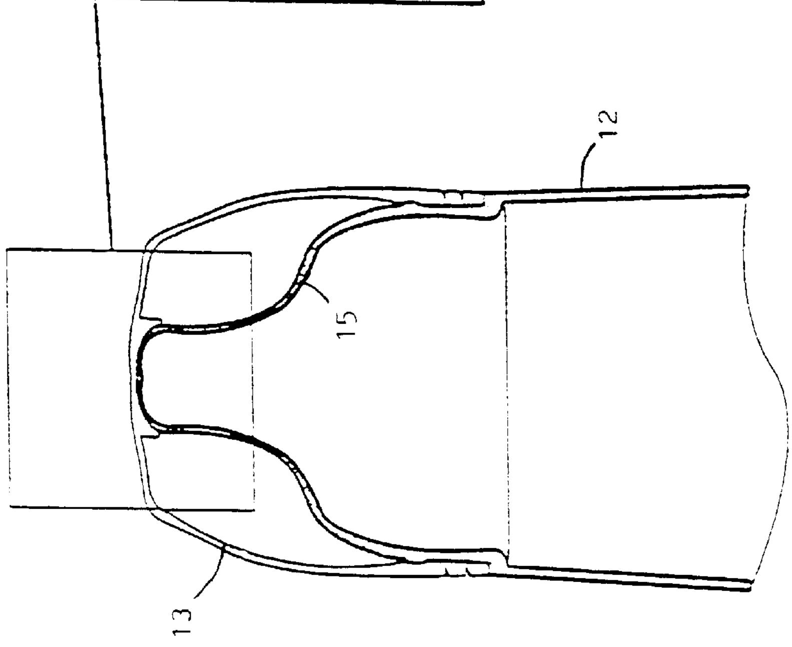
Figure 20:
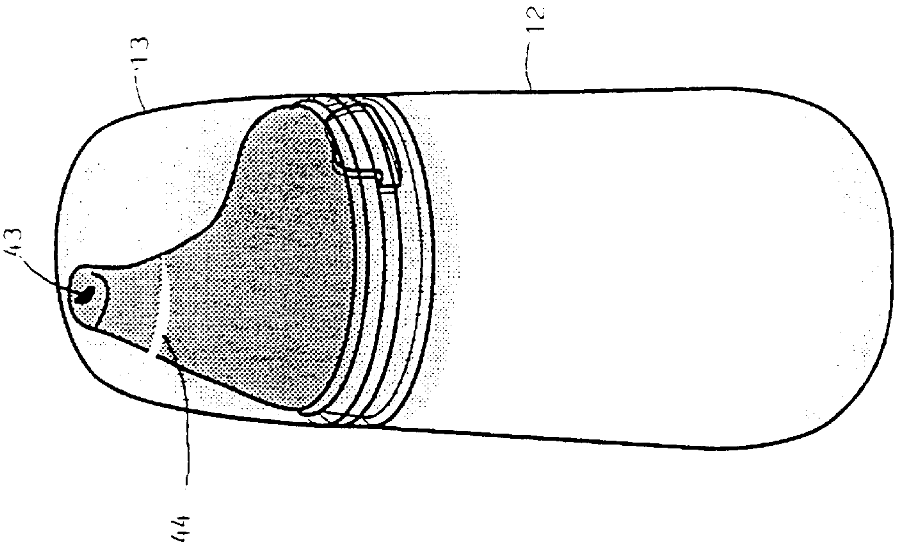
Figure 21:
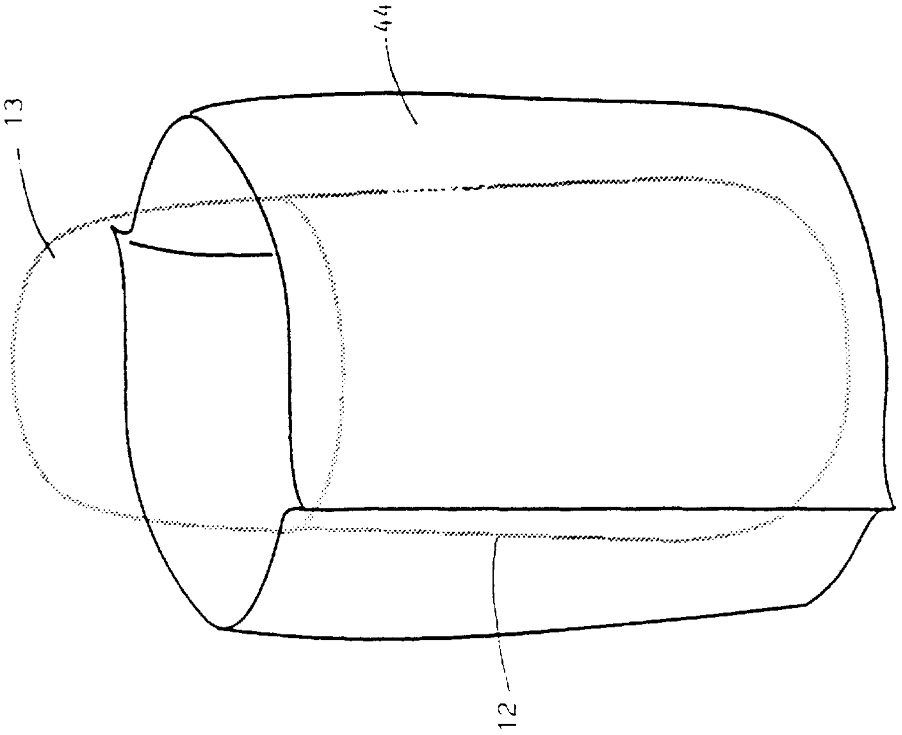
Figure 23:
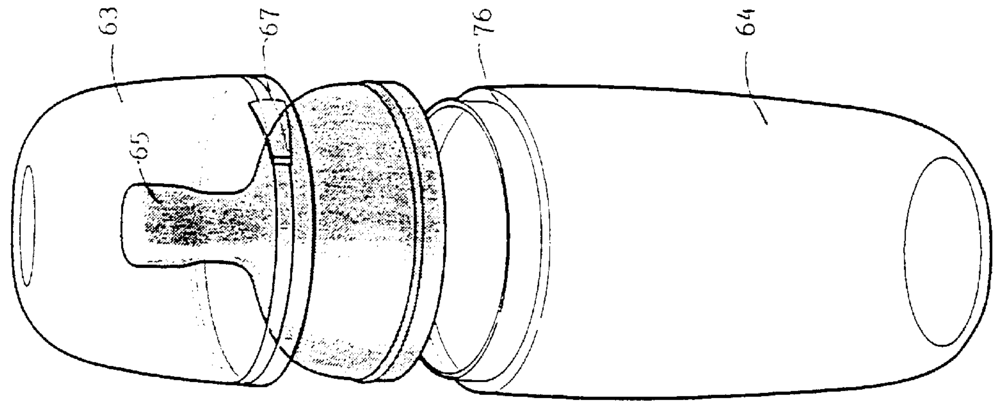
Figure 22:
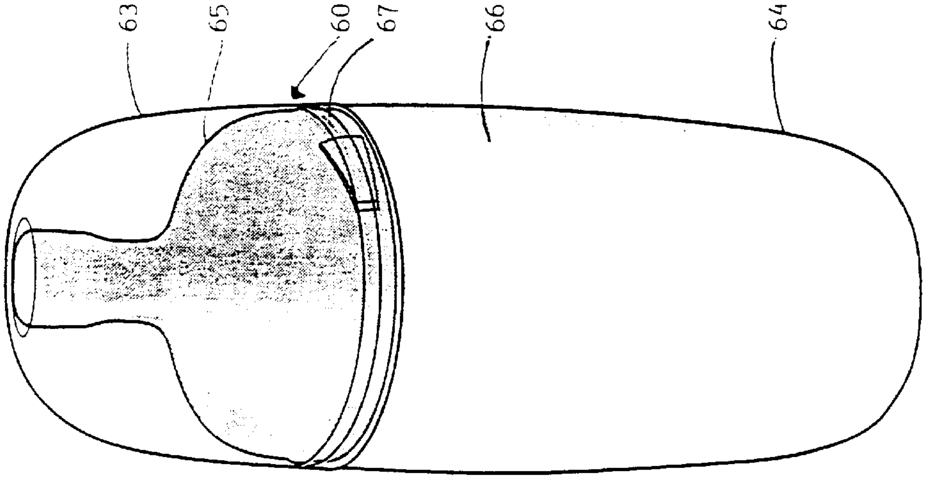
Figure 25:
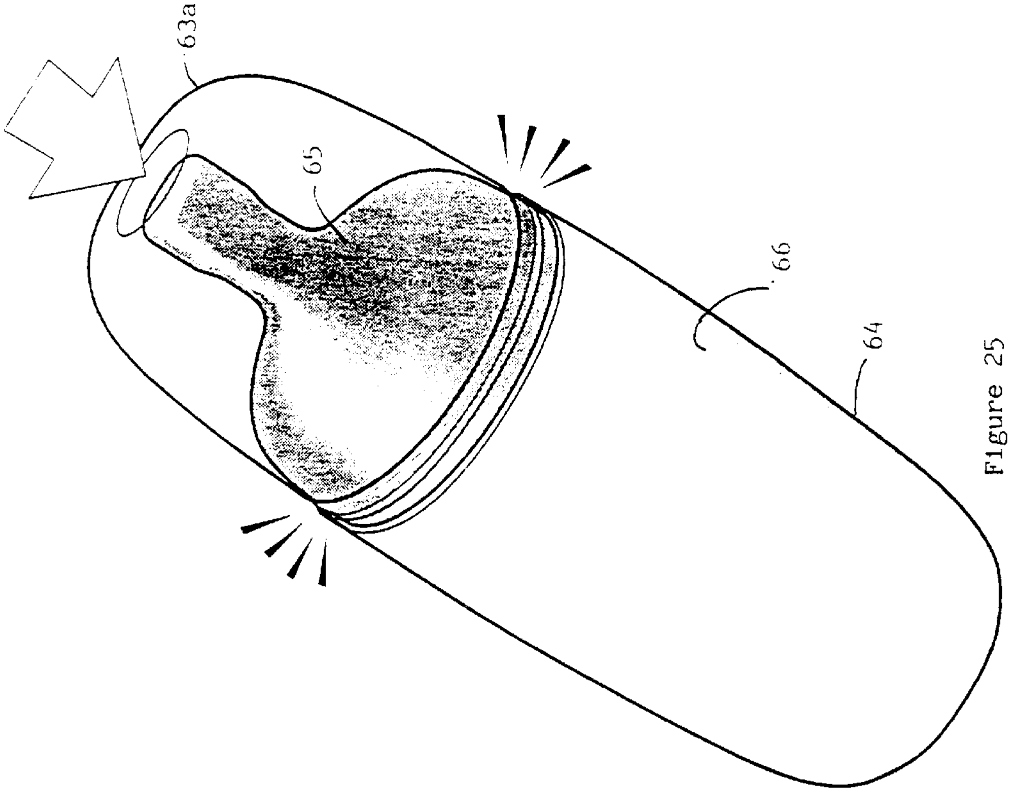
Figure 24:
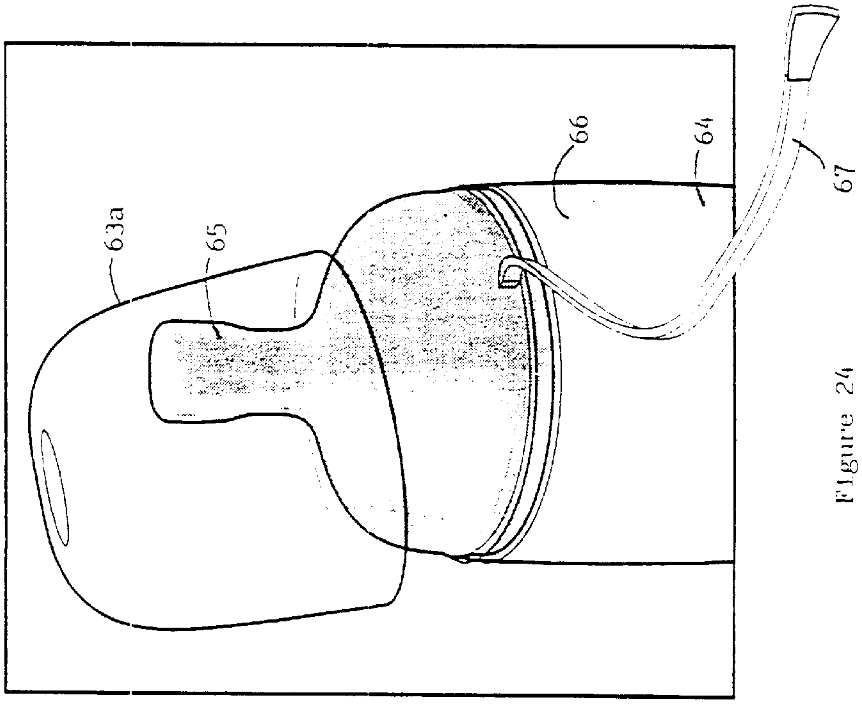
Figure 26:
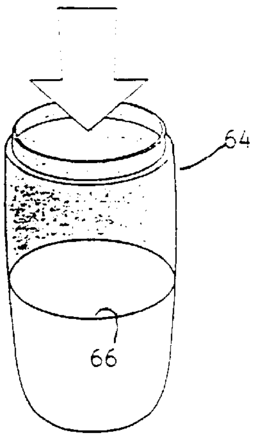
Figure 27:
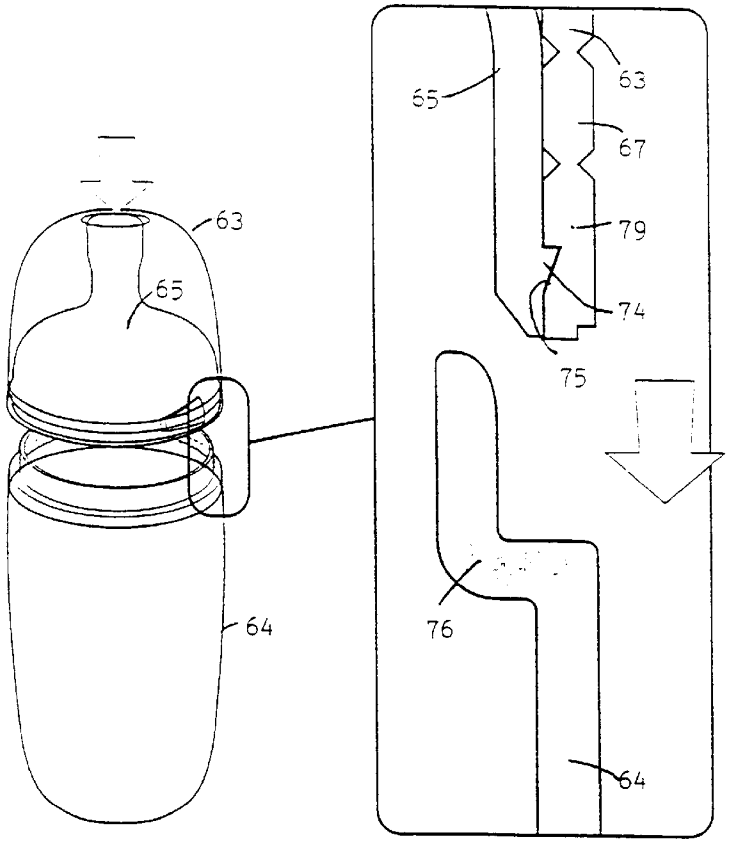
Figure 28:
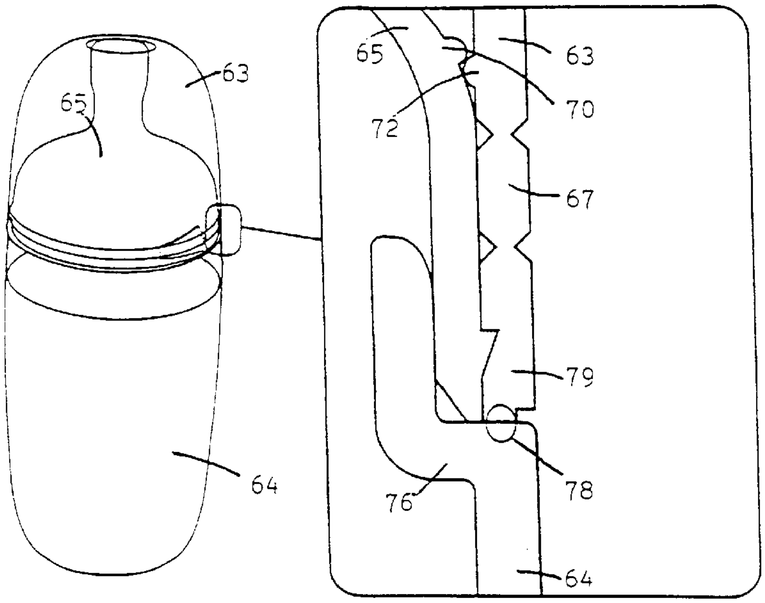
Figure 29:
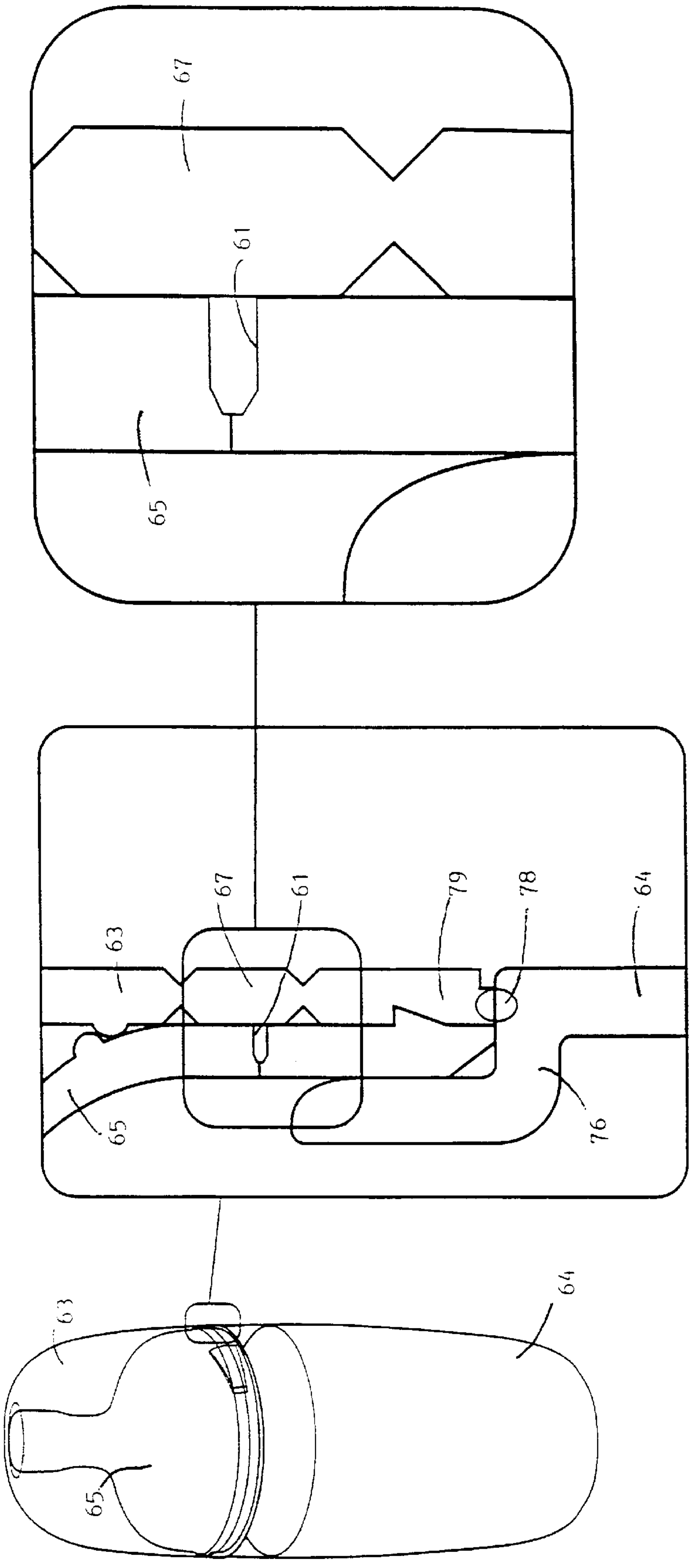
Figure 31:
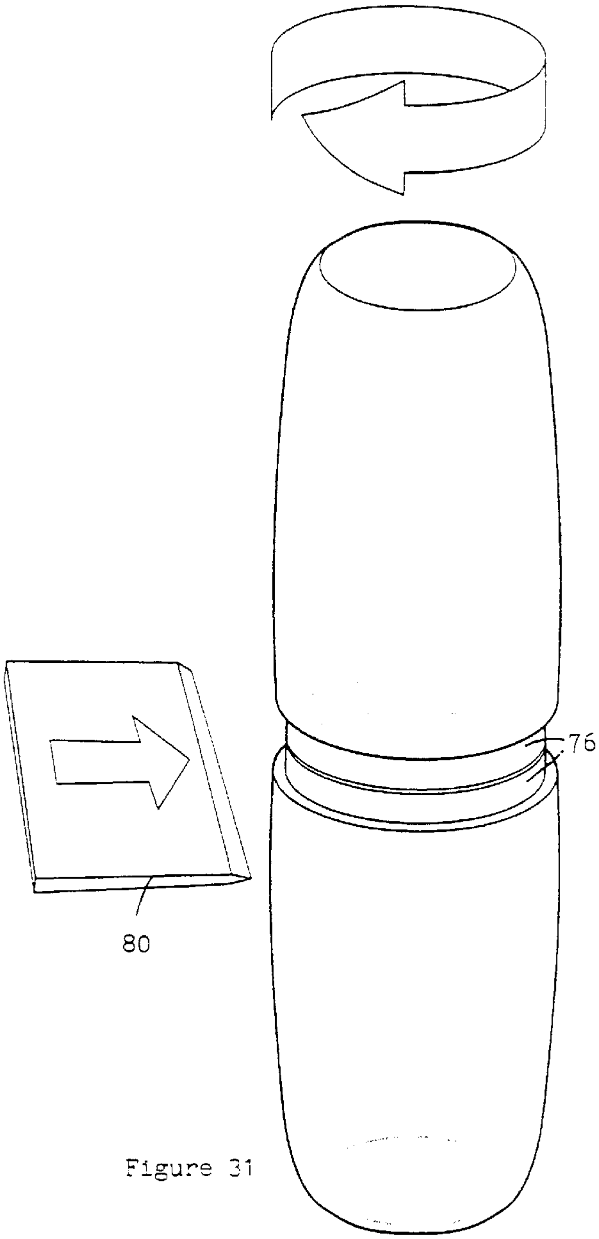
Figure 32:
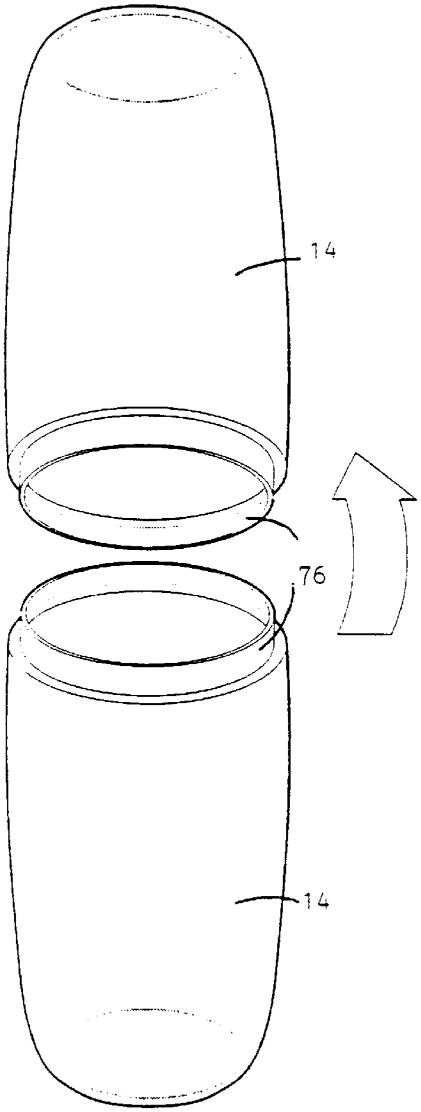
Figure 30:
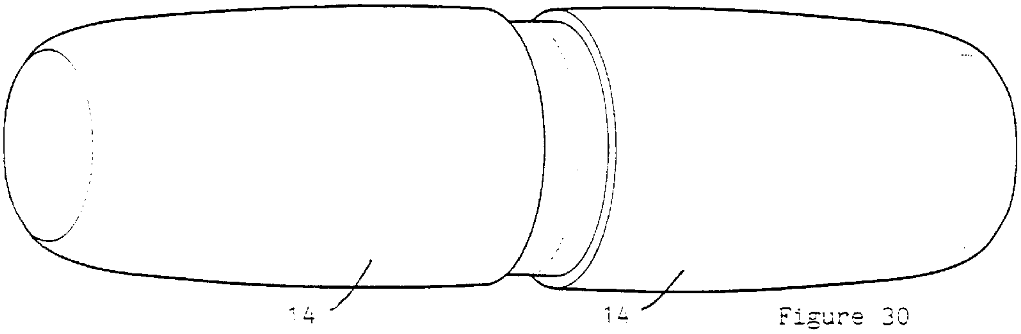
Figure 33:
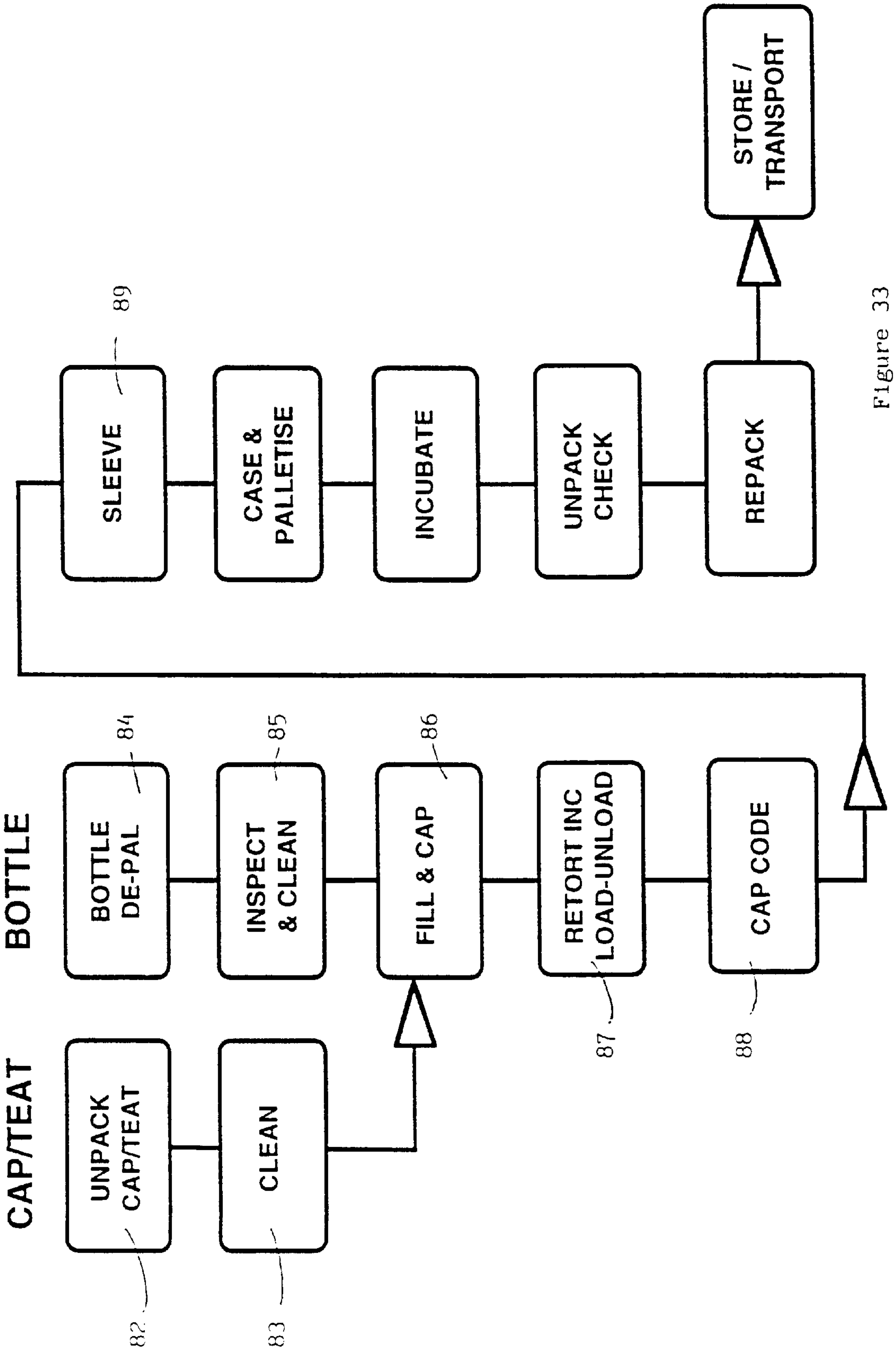

Two embodiments of the invention will now be described, by way of example, with reference to FIGS. 2 to 33 of the accompanying drawings in which FIGS. 2 to 21 illustrate the first embodiment (with modifications) and FIGS. 22 to 33 show the second embodiment (with a modification). In the drawings:

FIG. 2 shows a bottle forming the first embodiment of the invention in the form in which the bottle (containing a liquid feed) is supplied to a user such as a hospital, FIG. 3 shows the bottle of FIG. 1 but with a tear strip released so as to enable a cap portion of the bottle to be detached, FIG. 4 illustrates how a detached cap portion may be subsequently replaced on a body of the bottle so as to re-seal a teat, FIG. 5 shows, on an enlarged scale, a detail of FIG. 4, FIG. 6 shows a composite pre-form from which the body of the bottle is made, FIG. 7 shows the pre-form positioned in a mould ready to be blow-moulded, FIG. 8 shows the pre-form moulded to form a blank, FIG. 9 shows the moulded blank being filled with milk, FIG. 10 shows the sealing of the filling spout of the blank, FIG. 11 shows the blow-moulded blank, filled with milk and with its base sealed, as it appears after removal from the blow-mould, FIG. 12 illustrates the formation of an outlet orifice in the teat by means of laser drilling, FIG. 13 illustrates the formation of an outlet orifice in the teat by means of a cutter blade, FIG. 14 is a modification of the arrangement of FIG. 13, showing how the teat may be supported during cutting by the blade, FIG. 15 shows the separately formed cap ready for attachment to the bottle body, FIG. 16 illustrates the attachment of the cap to the bottle body by ultrasonic welding, FIG. 17 illustrates, on an enlarged scale, the welding of the cap to the body, FIG. 18 illustrates how the internal surface of the cap may be shaped to seal the top of the teat, FIG. 19 is a detailed view, on an enlarged scale, of part of FIG. 18, FIG. 20 shows a modified bottle according to the invention, FIG. 21 shows a bottle according to the invention provided with a jacket for warming the liquid feed in the bottle, FIG. 22 is an isometric view of the second embodiment of ready to use bottle, FIG. 23 is a view corresponding to FIG. 22 but shows the individual components of the bottle, FIG. 24 shows how removal of a tear strip enables a cap portion of the bottle to be detached, FIG. 25 illustrates how the cap portion may be replaced on a body of the bottle, FIG. 26 illustrates how a container portion of the body is pre-filled with milk during manufacture of the bottle, FIG. 27 shows how a sub-assembly of cap and teat is assembled to the filled container portion, the figure including a fragmentary part to an enlarged scale, FIG. 28 shows how the sub-assembly of the cap and teat is ultrasonically welded to the container portion, the figure including a fragmentary part to an enlarge scale, FIG. 29 shows a possible modification of the structure shown in FIG. 28, the figure including two fragmentary views at progressively larger scales, FIG. 30 illustrates how two container portions may be blow-moulded neck to neck, FIGS. 31 and 32 illustrate how a pair of blow-moulded container portions are separated by a parting tool, and FIG. 33 is a flow diagram showing the steps in a process for manufacturing the second embodiment of bottle.

Referring principally to FIGS. 2 and 3, the first embodiment of liquid feed bottle 10 comprises two plastics components, namely a body 12 and a transparent cap 13 injection moulded from a plastics material. The body 12 has a container portion 14 and a teat 15 which together enclose a volume of sterilised liquid milk 16 for feeding to a baby, for example in a maternity unit of a hospital or by a mother after she has left hospital with a new baby.

When the bottle is supplied to the hospital the cap 13 is sealed to the body 12 so as to enclose the teat 15 in a sterile environment. The extremity of the teat, having an outlet orifice, is sealed by the inner surface of the cap in a manner to be described. The attachment of the cap 13 to the body 12 can be broken by removal of a tear strip 17, as illustrated in FIG. 3. Hence, when it is required to feed milk to a baby, the user takes the bottle shown in FIG. 2, removes the tear strip 17 as illustrated in FIG. 3 so as to release the major portion 13*a* of the cap 13 and expose the teat for insertion in the baby's mouth.

The body 12 and the cap 13 have formations which enable the major portion 13*a* of the cap 13 to be repeatedly replaced on the body with a snap action so as to protect the teat, enabling the milk to be kept clean and sterile for later consumption. The inter-engaging formations are an external rib 20 on the body 12 and a thickened lower edge rim 22 of the cap, as best shown in FIGS. 4 and 5. From FIG. 5 it can be seen that the rib 20 is formed on the body at the transition between the container portion and the teat.

The body 12 of the bottle is made from the pre-form 23 shown in FIG. 6. The pre-form is injection moulded from two different synthetic plastics materials. The first plastics material constitutes the major part 24 of the pre-form and the second plastics material constitutes the minor part 25, forming the tip of the pre-form shown in FIG. 6. For example the first material may be high density polypropylene and the second material low density polypropylene/polyethylene co-polymer. Alternatively, the second material may be low density polyethylene.

Referring to FIG. 7, the pre-form 23 of FIG. 6 is placed in a two-part mould 26. A blow nozzle 27 is introduced into the upper open end of the pre-form 23 which is hot blow moulded so as to form the bottle blank 28 shown in FIG. 8, from which it will be seen that the first plastics material forms the fairly rigid container portion 14 of the body and the second plastics material forms the flexible teat 15 of the body. Whilst the blank 28 is still in the mould it is filed with liquid milk 29 through the fill tube 30 at the upper end of the blank (FIG. 9). The fill tube 30 is then heat sealed by cooperating sealing members 32, as shown in FIG. 10 from which it will be seen that this sealing step is carried out with the bottle blank (now filled with milk) still in the inverted position in the mould. FIG. 11 shows the resulting product as it appears on removal from the blow mould 26. The sealed fill tube forms a sealed strip 33 recessed in the (eventual) base of the body.

The filled bottle is now inverted so that the teat is uppermost, ready for cutting of an orifice in the top of the teat. This may be done by laser drilling so as to form one or more perforations in the tip of the teat, as illustrated at 34 in FIG. 12, or the teat may be cut with a blade, the outlet orifice then being in the form of an elongated slit. To achieve this, a cutter blade 35 of the form illustrated in FIG. 13 may be used to cut a slit in the upper end of the teat, and FIG. 14 illustrates how the teat may be supported by moveable jaws 36 during such a cutting operation.

To complete the manufacturing process, the cap 13 is ultrasonically welded to the body 12 to form a tamper-proof seal. FIG. 15 shows the pre-formed cap 13 and FIGS. 16 and 17 illustrate how the cap 13 is placed over the teat 15, engaging a ledge 38 on the exterior of the body, and how the lower edge of the cap rim is ultrasonically welded at 37 to the body around the periphery of the cap at a location below the tear strip 17 so that subsequent removal of the tear strip 17 releases the major portion 13*a* of the cap 13 but enables the latter to be repeatedly removed and snapped back into position on the body in the manner previously described. Hence the complete cap 13 consists of the anchorage ring which is welded at 37 to the body, the tear strip 17 and the removable cap portion 13*a*.

The inner surface of the cap 13 may be shaped to promote an effective seal against the top of the teat, to prevent milk from leaking into the space enclosed within the cap. As shown in FIGS. 18 and 19, this shaping may take the form of a downwardly projecting circular lip 40 integrally moulded in the cap and shaped to cooperate with and seal against the upper part of the teat 15.

The bottle illustrated in FIG. 20 is modified so as to have a spout 42 instead of a teat, and is thus suitable for use by older infants. The spout 42 is shaped to facilitate drinking, this being achieved by appropriate shaping of the lower parts of the blow mould 26. The spout end has an outlet opening in the form of a line of holes or an elongated slot 43.

A bottle according to the invention may be provided with a reusable and heatable jacket for warming the liquid feed, as illustrated at 44 in FIG. 21.

Instead of being milk, the fluid feed may be a fruit juice or other liquid feed products.

Referring initially to FIGS. 22 and 23, the second embodiment of liquid feed bottle 60 comprises a container portion 64 attached to a teat 65 which together enclose a volume of sterilised liquid milk 66 for feeding to a baby, for example in a maternity unit of a hospital or by a mother after she has left hospital with a new baby. The second embodiment of bottle is identical in appearance to the first embodiment.

When the bottle 60 is supplied to the hospital the teat 65 is covered and protected by a cap 63 so that the teat is enclosed in a sterile environment. The extremity of the teat, having an outlet orifice such as a slit, is sealed by the inner surface of the cap 63 which may be shaped, eg with a circular recess, to promote effective sealing against the extremity of the teat where the outlet orifice is formed. Adjacent its lower edge, the cap 63 has an encircling tear strip 67 which, when removed, enables the cap portion 63*a* to be detached from the body constituted by the container portion 64 and the teat 65. Hence, when it is required to feed milk to a baby, the user takes the bottle shown in FIG. 22, removes the tear strip 67 as illustrated in FIG. 24 so as to release the cap portion 63*a* and expose the teat 65 for insertion in a baby's mouth.

The bottle body 64, 65 and the cap 63 have interengageable formations which enable the cap portion (after removal of the tear strip) to be repeatedly removed from and replaced on the body with a snap action (FIG. 25) so as to protect and re-seal the teat, enabling the remaining milk to be kept clean and prevented from leaking out for later consumption. The interengageable formations are an external annular rib 70 on the teat 65 and an annular rib 72 on the internal surface of the cap 63, as best shown in the fragmentary part of FIG. 28.

The second embodiment of bottle was developed from the first embodiment to render the bottle more suited to manufacture and filling on existing production lines, with some modifications. FIGS. 26 to 28 illustrate the manufacture of the second embodiment of bottle. Referring to FIG. 26, the container portion 64 is filled with the milk 66. The open top of the pre-filled container portion 64 is then covered by a sub-assembly consisting of the cap 63 and teat 65. To form this sub-assembly the cap and teat are pushed together, the cap and teat inter-engaging by virtue of an external shoulder 74 on the teat 65 engaging in an internal groove 75 in the cap 63, as illustrated in the fragmentary part of FIG. 27.

The sub-assembly of the cap 63 and teat 65 is ultrasonically welded to the stepped upper rim 76 of the container portion so as to enclose the liquid milk feed in a sealed enclosure defined by the container portion and the teat. This ultrasonic welding occurs at the location 78 shown in the fragmentary part of FIG. 28. It will be appreciated that subsequent removal of the tear strip 67 releases the major portion 63*a* of the cap 63 in the manner previously described but that the ultrasonic weld retains a lower annulus (or anchorage ring) 79 of the cap on the rim 76, which in turn retains the teat 65 is sealing engagement with respect to the upper rim 76 of the container portion 64.

In the modification shown in FIG. 29, the teat 15 of the body has a valve 6, with an inner slit and an outer opening which is occluded by the tear off strip 67 but which is opened to the atmosphere when the tear strip is removed, to allow air to enter the body as the milk is drawn from the body. The slit is held closed by internal pressure in the body, so that the valve 61 acts as a non-return bleed valve, allowing air to enter the body as the milk is consumed.

The container portion 64 is preferably blow-moulded from polypropylene-ethylene vinyl alcohol-polypropylene coextruded material with excellent barrier properties. Two such portions 64 may be blow-moulded together as a pair with their necks together as shown in FIG. 30. The pair of container portions are then parted through the neck by a parting tool 80 as shown in FIG. 31, to provide a pair of container portions 14 (FIG. 32) each having an open neck (defined by the stepped rim 76) for eventual filling as shown in FIG. 26.

FIG. 33 is a flow diagram showing the manufacturing steps in the production of the second embodiment of ready to use filled bottle. The cap 63 is injection moulded from a synthetic plastics material, preferably polypropylene. The teat 65 is injection moulded from a synthetic plastics material, preferably a thermoplastic polypropylene-polyethylene pseudo elastomer. The caps can teats are supplied to the production line as the sub-assemblies previously described, clean in bulk bags. The sub-assemblies of caps 63 and teats 65 are unpacked (step 82) by removal from the bag and the sub-assemblies are cleaned (step 83). The container portion 64 of the bottle is unpacked and then inspected and cleaned (respective steps 84, 85). If the container portions are blown neck to neck, they are separated at their necks just prior to filling so that the insides of the container portions remain sterile. The container portion 64 is then filled with the liquid milk feed (FIG. 26) and the sub-assembly of cap 63 and teat 65 is then ultrasonically welded (FIG. 28) to the container portion 64 (step 86). The filled and sealed bottle is then fed into a retort, the retort cycle (step 87) sterlising the liquid feed but not harming the plastics materials of the container portion, teat or cap. After this, the bottle has a code added to its cap (step 88) and an outer sleeve attached around the bottle (step 89). The bottle is then further processed in the final conventional steps indicated diagrammatically in FIG. 33.

Instead of milk, the bottle may hold other liquids, such as sterile water, fruit juices or liquid feeds for animals.

What is claimed is:

1. A liquid feed bottle holding a liquid feed for internal consumption by a young mammal, the bottle comprising a body which holds the liquid feed and which has a container portion and a teat or spout with an outlet orifice and a cap which covers and protects the teat or spout and initially maintains the teat or spout in a sterile environment, wherein the cap is bonded or sealed to the body, at least a portion of the cap being initially detachable from the body after rupturing a tear strip, said portion being subsequently repeatedly detachable from the body and securable on the body by a snap action press fit.

2. A liquid feed bottle according to claim 1, wherein the container portion and the teat or spout are secured together by a permanent sealed connection.

3. A liquid feed bottle according to claim 1, wherein the cap has thickened lower edge rim cooperable with an external rib in the body, to provide said snap action press fit.

4. A liquid feed bottle according to claim 1, wherein the cap portion is shaped so that when it is attached to the body an internal surface of the cap portion seals the orifice in the teat or spout.

5. A liquid feed bottle according to claim 1, wherein the bottle consists of the body, cap and liquid feed only.

6. A liquid feed bottle according to claim 1, wherein the bottle comprises two pre-formed plastics parts, namely the body having the container portion and the teat or spout, and the cap.

7. A liquid feed bottle according to claim 1, wherein the body is blown from a pre-form made of two synthetic plastics materials so that the resulting body has a first portion made of a first plastics material and a second portion made of a second plastics material.

8. A liquid feed bottle according to claim 7, wherein the first portion constitutes the container portion and the second portion constitutes the teat or spout.

9. A liquid feed bottle according to claim 8, wherein the first portion is comparatively rigid and the second portion is comparatively flexible.

10. A liquid feed bottle according to claim 1, wherein the body has a valve with an opening which is occluded by the cap but which is opened when the cap portion is removed from the body, to allow air to enter the container as the liquid feed is drawn from the body.

11. A method of making a bottle containing a liquid feed according to claim 1, comprising attaching together a teat or spout and a cap to form a sub-assembly, and attaching the sub-assembly to a container portion pre-filled with the liquid feed to yield a filled and sealed bottle with the teat or spout covered and protected by the cap.

12. A method according to claim 11, wherein the sub-assembly and the container portion are of plastics, the sub-assembly being attached to the filled container portion by spin welding or by ultra-sonic welding.

13. A method of making a bottle containing a liquid feed according to claim 1, comprising blow moulding a pre-form to form a bottle blank having a body with a teat or spout, filling the blank with the liquid feed whilst the bottle is oriented with its teat or spout lowermost, sealing a filling hole to form an enclosed bottle containing the liquid feed, inverting the filled bottle so that the teat or spout is uppermost, forming an outlet orifice in the teat or spout to enable the liquid feed to be extracted from the bottle and attaching to the body a cap which covers and protects the teat or spout.

14. A method according to claim 13, wherein the blank is filled with liquid feed whilst still in the mould.

15. A method according to claim 14, wherein the filling hole is also sealed whilst the filled blank is still in the mould.

16. A method according to claim 13, wherein the outlet orifice is formed by laser drilling to form one or more holes in the top of the teat or spout.

17. A method according to claim 13, wherein the teat or spout is cut to form an outlet orifice in the shape of an elongated slit.

* * * * *